(12) United States Patent
Adrian

(10) Patent No.: US 7,140,118 B2
(45) Date of Patent: Nov. 28, 2006

(54) WORKPIECE CENTER AND EDGE FINDER HAVING VISUAL LIGHT INDICATOR

(76) Inventor: Merle Skip Adrian, P.O. Box 44, Piedra, CA (US) 93649

( * ) Notice: Subject to any disclaimer, the term of this patent is extended or adjusted under 35 U.S.C. 154(b) by 0 days.

(21) Appl. No.: 11/184,405

(22) Filed: Jul. 19, 2005

(65) Prior Publication Data

US 2006/0053643 A1    Mar. 16, 2006

Related U.S. Application Data

(60) Provisional application No. 60/609,331, filed on Sep. 13, 2004.

(51) Int. Cl.
*G01B 11/27* (2006.01)
(52) U.S. Cl. .................. 33/286; 33/642; 33/DIG. 21
(58) Field of Classification Search .............. 33/227, 33/262, 263, 275 R, 286, 613, 638, 642, 33/645, DIG. 21
See application file for complete search history.

(56) References Cited

U.S. PATENT DOCUMENTS

| | | | | |
|---|---|---|---|---|
| 2,557,029 | A * | 6/1951 | Griffin | 33/286 |
| 3,985,462 | A | 10/1976 | Didato | |
| 3,999,299 | A | 12/1976 | Johnson | |
| 4,045,129 | A * | 8/1977 | Hamar | 372/107 |
| 4,078,869 | A * | 3/1978 | Honeycutt | 33/286 |
| 4,429,463 | A | 2/1984 | Angell | |
| 4,438,567 | A * | 3/1984 | Raiha | 33/286 |
| 4,566,202 | A * | 1/1986 | Hamar | 33/286 |
| 4,622,751 | A | 11/1986 | Berg | |
| 5,217,336 | A | 6/1993 | LeBlanc | |
| 5,245,759 | A * | 9/1993 | Pearson | 33/638 |
| 5,276,975 | A | 1/1994 | Fisher | |
| 5,358,364 | A * | 10/1994 | Kall | 33/642 |
| 5,371,953 | A * | 12/1994 | Nower et al. | 33/645 |
| 5,568,265 | A * | 10/1996 | Matthews | 33/286 |
| 5,684,578 | A * | 11/1997 | Nower et al. | 33/286 |
| 6,050,816 | A * | 4/2000 | Phoenix et al. | 33/286 |
| 6,151,788 | A * | 11/2000 | Cox et al. | 33/286 |
| 6,606,797 | B1 * | 8/2003 | Gandy | 33/227 |
| 6,796,038 | B1 * | 9/2004 | Humphries | 33/DIG. 21 |
| 6,898,860 | B1 * | 5/2005 | Wu | 33/286 |
| 6,937,336 | B1 * | 8/2005 | Garcia et al. | 33/286 |
| 2002/0038513 | A1 * | 4/2002 | Kallesen et al. | 33/286 |

OTHER PUBLICATIONS

Forest Addy, "Using the Edge Finder", The Home Shop Machinist, Mar./Apr. 2004, 36-37, vol. 23, No. 2, Village Press, Inc., US.

Forest Addy, "Using the Wiggler for Drilling Accurately Located Holes", The Home Shop Machinist, Mar./Apr. 2004, 36-37, vol. 23, No. 2, Village Press, Inc., US.

* cited by examiner

*Primary Examiner*—G. Bradley Bennett
(74) *Attorney, Agent, or Firm*—Richard A. Ryan

(57) ABSTRACT

A precise center and edge finder in which the position of the center or edge of a workpiece is directly located with respect to a work tool, such as a milling machine having a spindle driven chuck. The finder has a housing with a shank at one end for attachment to the chuck and a discharge aperture at the other end for discharging a beam of light toward the center or edge of the workpiece. Disposed within the housing is a source of light, preferably a laser diode module, and batteries to power the light source. The beam of light from the finder projects downward in alignment with the centerline of the spindle to the previously marked center or along the edge of the workpiece. The finder eliminates the need for calculations to find the true edge and the risk of contact damage to the workpiece or precision tool.

36 Claims, 4 Drawing Sheets

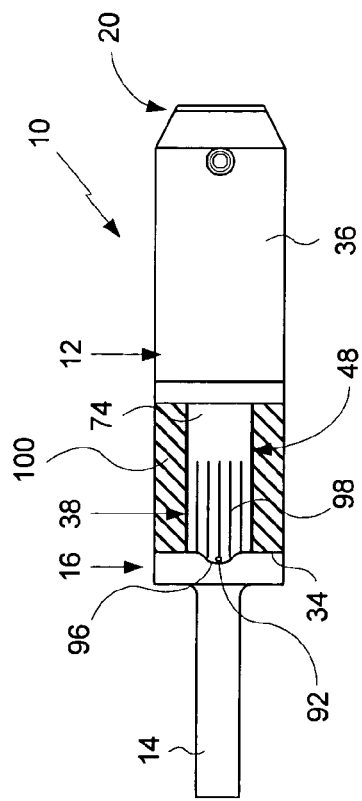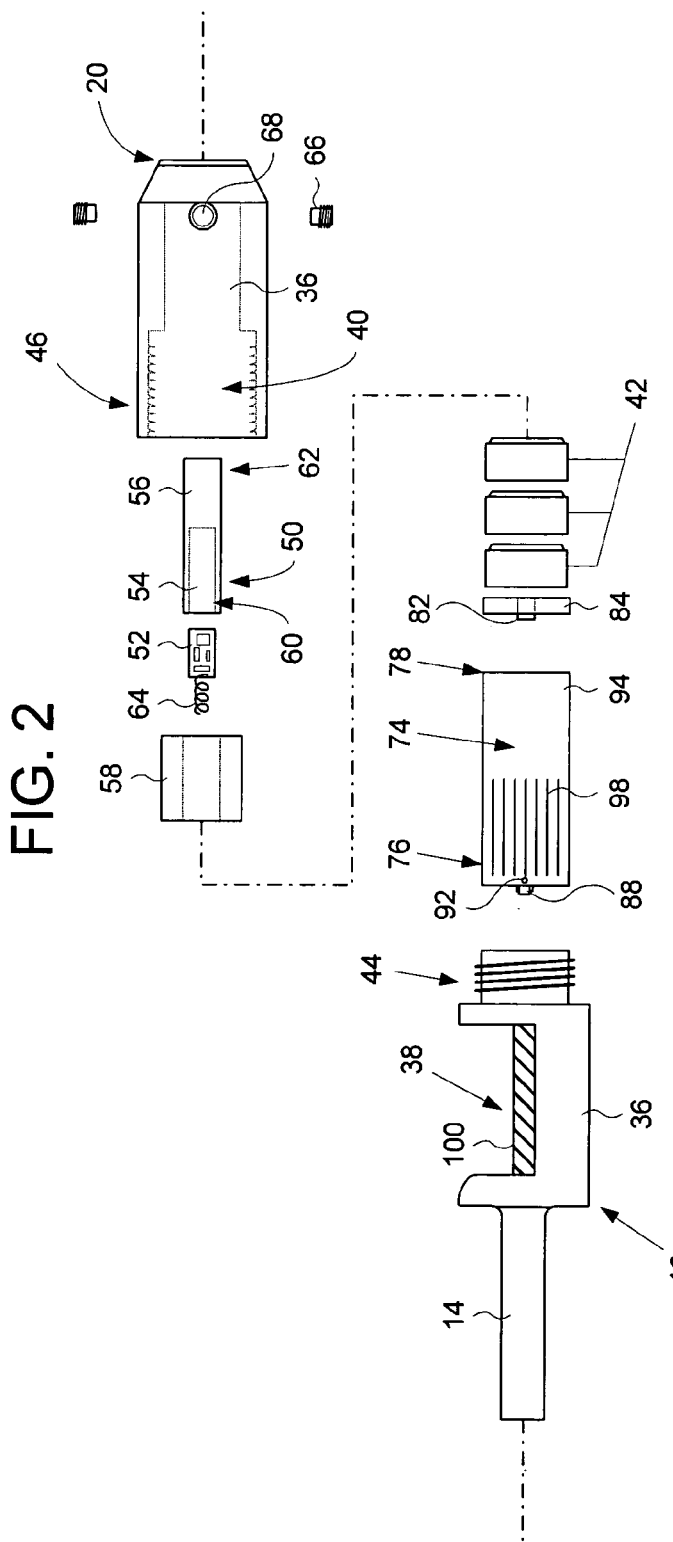
FIG. 2
FIG. 3

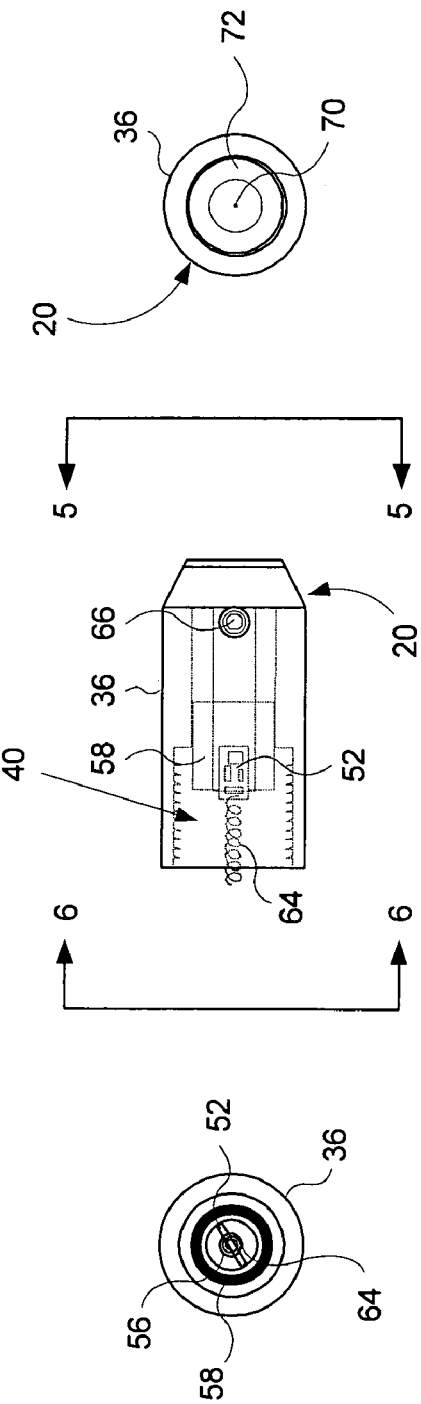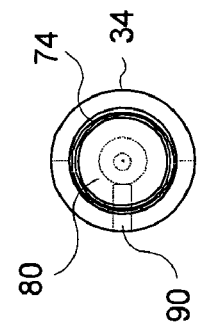

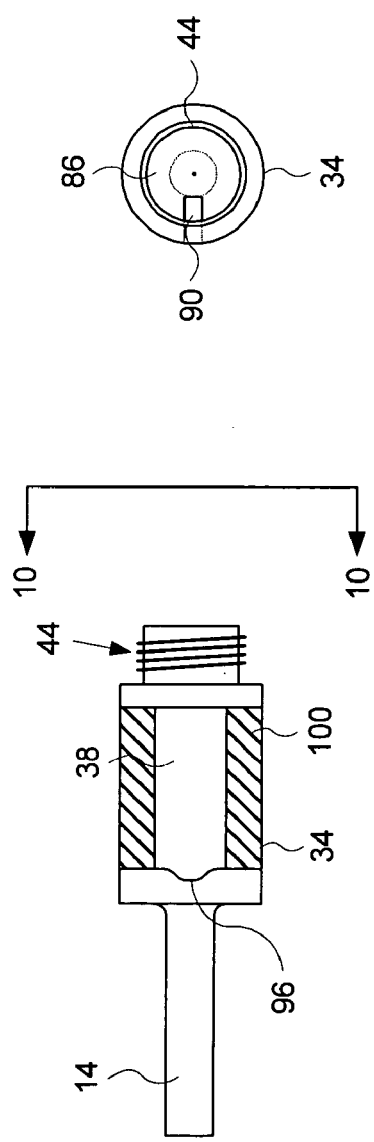
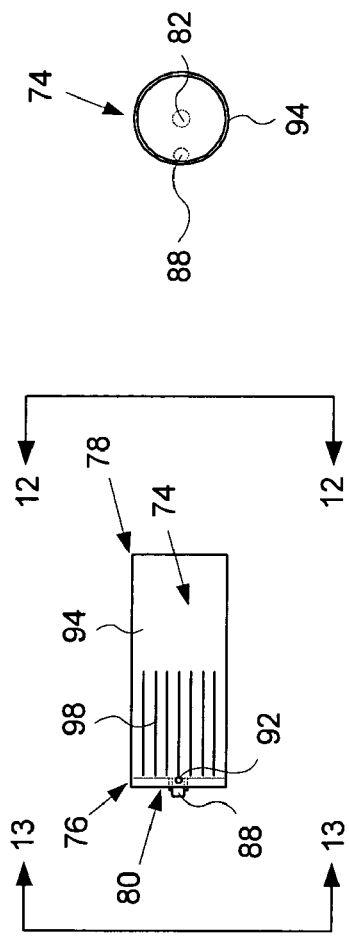
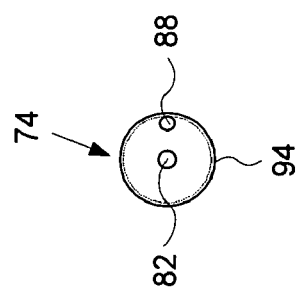

WORKPIECE CENTER AND EDGE FINDER HAVING VISUAL LIGHT INDICATOR

CROSS-REFERENCE TO RELATED APPLICATIONS

This application claims the benefit of U.S. Provisional Application No. 60/609,331 filed Sep. 13, 2004.

BACKGROUND OF THE INVENTION

A. Field of the Invention

The field of the present invention relates generally to positioning devices utilized to precisely position a work tool, such as a drilling or milling machine, above a workpiece. More specifically, this invention relates to such devices that utilize a visual mechanism to locate the precise center, specific spot or edge of the workpiece so that such position may be used as a reference point for performing work operations. Even more specifically, this invention relates to such devices that utilize a light beam, such as from a laser, as the visual mechanism.

B. Background

When working a piece of material with a milling machine or similar type of work tool, the machinist must first identify a reference or starting point from which the various dimensions and locations for the milling work to be performed on the workpiece will be measured. As known by those skilled in the art, failure to properly identify the reference point will generally result in a waste of time and material as the milling work is improperly positioned on the workpiece. Once found, this reference or starting point on the workpiece is then set in corresponding relationship with the centerline of the working part of the milling machine or other work tool so that the milling work will be performed at the correct location. The most common reference point utilized by most machinists is either the center or an edge of the workpiece. From the center or edge of the workpiece, dimensions are utilized to properly position the workpiece under the milling machine so that the work operation is performed at the desired location. Typically, the workpiece is generally clamped or otherwise held in place on a table under the working part of the milling machine. For the center of the workpiece, the machinist will typically first manually measure, locate and then mark the center with a punch. Once the center or edge of the workpiece is found with respect to the centerline of the milling tool, which typically requires some adjustments, the machinist can perform the desired operations at the correct location. A similar type of process can also be used for identifying the position of holes, which may need to be drilled, tapped, edges chamfered, countersunk or have other work done, to be drilled into or through the workpiece. Once the hole locations are identified by prick-punching the workpiece, the ability to accurately drill at the hole position is somewhat based on the machinist's ability to position the workpiece with regard to the centerline of the drill press spindle.

The procedures and tools utilized by most machinists to locate the center or edge of a workpiece relative to a milling machine or other work tool indirectly locate the reference point, in that they require the machinist to make measurement adjustments. A common method utilized to find an edge of a workpiece is generally referred to as the contact or bump method. In this method, a simple piece of round stock is placed in the mill spindle and the work tool is hand cranked to gently abut the edge of the workpiece against the round stock. To align the work machine with the edge of the workpiece, the machinist then raises the round stock above the workpiece and moves the workpiece over half the diameter of the round stock. The micrometer dial setting at this position is zeroed to correspond to the edge of the workpiece, thereby aligning the work tool (i.e., the spindle centerline) with the plane running through the edge of the workpiece. Although the contact or bump method is quick and simple, it is well known that it is generally not that accurate due to the inherent problems associated with trying to recognize when the contact occurs and the elasticity of the materials involved. In addition, to the inherent accuracy problems, it is not that uncommon for machinists, particularly relatively inexperienced or hurried machinists, to forget to take into account the one-half of the diameter of the round stock used as the edge finder. Another problem known to be associated with this method of edge finding is that too much contact against the workpiece, which for certain metals is not that much contact, can dent or otherwise damage the workpiece.

Another method for finding the edge of a workpiece utilizes a tool commonly known as a wiggler, which has been used by machinist for over a century. Most wiggler sets come with an edge finder component that has a generally mushroom-shaped disk contact at the end of the wiggle shank opposite that which fits into the collet, typically in a ball and socket type of arrangement. As with the contact method described above, the workpiece is moved towards the spinning edge finder until it gently touches the disk contact and steadies the wiggling. The workpiece is then slowly dialed further towards the edge finder until it is spinning true (i.e., no wiggle). At the point the edge finder starts to slip sideways from the drag of the spinning disk against the workpiece, the machinist has found the edge of the workpiece. As with the contact method, the machinist then raises the edge finder and dials in half of its diameter, typically 0.100 inches, to align the spindle centerline with the edge plane of the workpiece. Although the wiggler edge finder is generally considered to be very accurate for routine machine work and good enough for most high precision work, it is known to be frustrating to utilize due to the fact that it has to be reset for each edge contact.

The typical wiggler set also includes a pointer component that fits within the same wiggle shank, but has a pointed end instead of the mushroom-shaped disk contact for the edge finder component. When the wiggle shank is chucked into the milling machine or other work tool and run, the end of the pointer will spin in a random-angled cone. The machinist, typically utilizing his or her thumbnails or other parts of their fingers, will guide the end to concentricity to correspond with the work tool spindle axis. The machinist then guides the workpiece to position the center punch mark, using visual alignment, under the pointed end to align the mark with the spindle axis. Unfortunately, manually adjusting the wiggler point to concentricity can result in injury to the machinist's finger(s), particularly for the novice machinist. If the wiggler is guided past center, the pointed end has a tendency to wildly spin, requiring realignment. Although this method can be very accurate, it does require the machinist to eyeball the alignment by mentally projecting a straight line to the marked center point of the workpiece.

Another well known mechanical edge finder utilizes a spring loaded conical disc that spins while free of the workpiece and then suddenly kicks or slips sideways when contact with the edge of the workpiece is obtained. Unlike the wiggler edge finder, however, the disc of this type of edge finder only slips a certain amount and then goes no further. As a result, the machinist can back up and try again without having to reset the contact by hand. Once the edge is found, the machinist moves the workpiece, generally by moving the mill table, over one-half the diameter of the edge finder to align the spindle axis with the plane of the workpiece edge. Some of these types of edge finders include a conically-shaped center finder having a pointed end that is utilized in the same manner as that described above for the wiggler center finder component.

A number of prior art center and/or edge finders are described in issued patents. For instance, U.S. Pat. No. 3,999,299 to Johnson describes an edge finder having a housing adapted to be received by the chuck on a work tool spindle, a slide biased against the housing by a spring that permits lateral movement of the slide and an outwardly extending finger that is rotatably attached to the slide at one end and shaped with a flat face at the other end to engage the side or edge of the workpiece. The plane of the flat face is configured to be in alignment with the axis of the work tool. Like the prior art devices set forth above, the workpiece is moved towards the edge finder until the edge is brought into contact with the flat face, at which time the slide moves at a right angle to the direction the workpiece is traveling indicating alignment with the edge. Unlike the above devices, however, no measurement adjustment is required. U.S. Pat. No. 5,217,336 to LeBlanc discloses an edge finder having an elongated body with a push pin at the semi-circular cross-section lower end that is contacted by the edge of the workpiece to operatively engage a lever connected to a dial indicator. The plane of the flat side of the lower end, which comes into contact with the workpiece edge when the pin is fully engaged, is in alignment with the axis of the spindle, thereby eliminating the need to factor in an adjustment. U.S. Pat. No. 4,429,463 to Angell discloses an electromechanical datum point locator tool that utilizes a cylindrical tip assembly that has an electrically conductive sleeve which causes a light to be emitted from the circumference of the tool's cylindrical housing when contact with the edge of the workpiece is obtained. The machinist must adjust for one-half the diameter of the tool's tip. U.S. Pat. No. 5,276,975 to Fisher describes an audible-visual edge finder having a working end member at the end of a cylindrical shank. The working end member has a flat that is configured to make an audible sound when it contacts the workpiece and to cause the finder to vibrate radially, thereby enhancing the sideways jump, to visually signal contact with the workpiece. Like the above patent, the machinist must adjust for one-half the diameter of the working end member. U.S. Pat. No. 4,622,751 to Berg describes an electromechanical measuring device having a workpiece contacting finger connected to a strain gauge or pressure transducer to locate the center of circular bores and pins relative to the axis of rotation of the spindle.

While the forgoing prior art devices and patents describe center and/or edge finders that are configured to locate and position the axis of the spindle above the center or edge of a workpiece, they all have limitations that either reduce their accuracy or effectiveness. For instance, the devices that require the machinist to add one-half the width or diameter of the tool are indirect methods of finding the workpiece edge or center, which can be forgotten by the novice or rushed machinist. Naturally, this mistake generally results in a waste of time and material. All of the aforementioned devices require the machinist to push the workpiece into contact with the edge finder in order to locate the edge of the workpiece, a process that always presents the potential of damaging the workpiece or precision tool if too much force is applied. A number of the aforementioned devices are not configured or useful for finding the center of a workpiece. What is needed, therefore, is a workpiece center and edge finder that provides direct indication of placement of the spindle axis over the edge or center of the workpiece without requiring physical contact between the workpiece and the finder tool. The preferred center and edge finder should be adaptable to a wide variety of work tools, including milling machines, lathes and the like. The preferred center and edge finder should be relatively simple to use.

SUMMARY OF THE INVENTION

The workpiece center and edge finder of the present invention provides the benefits and solves the problems identified above. That is to say, the present invention discloses a center and edge finder that is configured to allow the machinist to easily and directly position the axis of the spindle above the center or edge of a workpiece. The workpiece center and edge finder of the present invention utilizes a visual beam of light to make contact with the center or edge of the workpiece, thereby eliminating the need to have physical contact between the workpiece and the tool, avoiding the inherent risk of damaging the workpiece and/or tool and eliminating several steps required for indirect and/or contact types of devices. The preferred embodiment of the present invention has a minimum of moving parts, thereby increasing reliability and simplifying the use of the tool to position the spindle over the center or edge of a workpiece. As such, the center and edge finder of the present invention reduces the likelihood of errors and the time necessary to locate the center or edge of a workpiece. The center and edge finder of the present invention is adaptable to a wide variety of different types of work tools, including milling machines, lathes and the like.

In one general aspect of the present invention, the center and edge finder is configured for use with a work tool, such as one having a rotating spindle and a chuck attached thereto, such as a milling machine, lathe or the like. In a preferred embodiment of the present invention, the center and edge finder comprises a support member, preferably a housing, that has a first end and a second end with a light source capable of generating a beam of light and a source of electricity. In the preferred embodiment, the light source and source of electricity are disposed in the housing, the light source is a laser such as provided from a laser diode module, and the source of electricity is one or more batteries. The first end of the housing is configured to be engaged by the work tool and secured thereby such that the second end of the housing is generally disposed in spaced apart relation above the workpiece. In the preferred embodiment, a shank is located at the first end and secured to the work tool by the chuck or collet. The second end of the housing has a discharge aperture that is configured to allow the light from the light source to pass therethrough and towards the workpiece. Preferably, the discharge is sized and configured to narrow the beam of light from the light source to provide a fine dot at the workpiece. An on/off mechanism allows control of the light source. In the preferred embodiment, the electrical circuit includes the batteries, light source and housing and the on/off mechanism is configured to electrically separate the batteries from the housing, thereby breaking the electrical circuit and turning off the light source. A battery holder is configured to hold the batteries and have a projecting member that selectively moves from engagement with a recess portion of the housing that electrically connects the housing and batteries to out of engagement with the recess portion so as to electrically separate the housing from the batteries. In the preferred embodiment, the laser diode module is disposed in a light tube at the second end of the housing that is electrically connected to the housing by one or more adjusting members, which are preferably threaded screws or the like. In addition to providing electrical contact, the adjusting members allow the user to align the beam of light so that it is in alignment with centerline of the spindle or other operating part of the work tool. In use, the beam of light from the finder is directed downward towards the workpiece and the workpiece is moved until the beam of light either hits the previously marked center spot or is directed along the edge of the workpiece, thereby aligning the centerline of the spindle with the center or edge of the workpiece. Use of the center and edge finder of the present invention eliminates the need to make adjustment calculations to the determine the true center or edge of the workpiece.

Accordingly, the primary objective of the present invention is to provide a center and edge finder for finding the center or edge of a workpiece in relation to the axis of a work tool spindle that provides the advantages discussed above and overcomes the disadvantages and limitations which are associated with presently available center and/or edge finder tools.

An important objective of the present invention is to provide a center and edge finder that provides a direct method of finding the center or edge of a workpiece relative to the axis of a work tool spindle so as to eliminate the potential error of not adding in one-half the diameter of the finder and the time necessary to make that calculation.

It is also an important objective of the present invention to provide a center and edge finder that utilizes a beam of light to align the axis of the work tool spindle with the center or edge of a workpiece, thereby eliminating the need to have physical contact between the finder and the workpiece.

It is also an important objective of the present invention to provide a center and edge finder that has a minimum of moving parts to improve reliability and simplify use of the finder to locate the center or edge of a workpiece relative to the axis of the spindle of a work tool.

It is also an important objective of the present invention to provide a center and edge finder that is adaptable to a wide variety of different work tools.

It is also an important objective of the present invention to provide a center and edge finder that comprises an electrically operated laser module to generate a beam of light that passes through a very small diameter opening in the finder's housing to locate the center or edge of a workpiece relative to the spindle of a work tool, such as a milling machine, lathe or the like.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 2 is a side view of a center and edge finder configured according to a preferred embodiment of the present invention;

FIG. 3 is an exploded view of the center and edge finder of FIG. 2 showing the components thereof;

FIG. 4 is a side view of the lower housing component of the center and edge finder of FIG. 2;

FIG. 5 is an end view of the lower housing taken through 5—5 of FIG. 4 showing the second or lower end of a preferred embodiment of the center and edge finder of the present invention;

FIG. 6 is an end view of the lower housing taken through 6—6 of FIG. 4 showing the installed laser module of a preferred embodiment of the center and edge finder of the present invention;

FIG. 7 is a side view of the upper housing component of the center and edge finder of FIG. 2;

FIG. 8 is an end view of the upper housing taken through 8—8 of FIG. 4 showing the battery sleeve disposed therein;

FIG. 9 is a top view of the upper housing component of the center and edge finder of FIG. 2;

FIG. 10 is an end view of the upper housing component taken through 10—10 of FIG. 9;

FIG. 11 is a side view of the battery holder component of the center and edge finder of FIG. 2 with the battery button disposed therein;

FIG. 12 is an end view of the battery holder taken through 12—12 of FIG. 11; and FIG. 13 is an end view of the battery holder taken through 13—13 of FIG. 11.

DETAILED DESCRIPTION OF THE PREFERRED EMBODIMENTS

Figure 1:
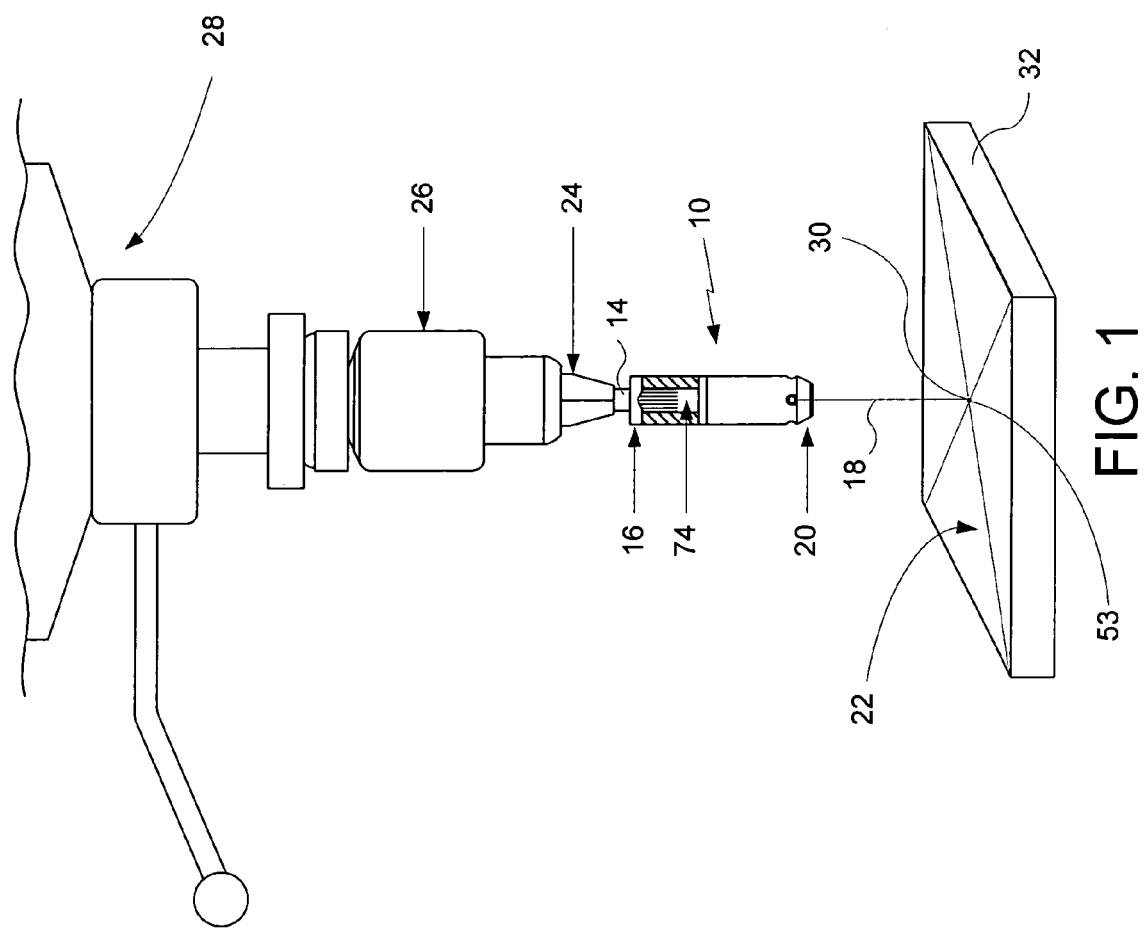
FIG. 1 is a perspective side view of a center and edge finder configured according to a preferred embodiment of the present invention shown mounted in an adjustable chuck of a milling machine spindle projecting a beam of light to the center position of a workpiece.

With reference to the figures where like elements have been given like numerical designations to facilitate the reader's understanding of the present invention, and particularly with reference to the embodiment of the workpiece center and edge finder of the present invention illustrated in the figures, a preferred embodiment of the present invention is set forth below. The enclosed description and drawings are merely illustrative of one or more preferred embodiments and represent at least one of several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

A center and edge finder manufactured out of the materials and configured pursuant to the principles of the present invention is shown generally as 10 in the figures. As shown in FIGS. 1 and 2, in a preferred embodiment center and edge finder 10 is configured generally with a support structure, such as housing 12, having a shank 14 at the first end 16 of housing 12 and configured to emit a beam of light, shown as 18 in FIG. 1, from the second end 20 of housing 12 towards workpiece 22. In the preferred embodiment, shank 14 is adapted to be engagedly received in the chuck or collet 24 of the spindle 26 portion of a work tool 28, such as a milling machine or the like, in order to find the center 30 or edge 32 locations of workpiece 22 so as to align the vertical axis of spindle 26 therewith so the desired work operations, such as milling, and the like, can be performed at the proper locations on workpiece 22. In the preferred embodiment, housing 12 comprises an upper housing 34 and a lower housing 36 that are threadably connected together to form one or more compartments therein, such as battery compartment 38 and light compartment 40 (shown in FIG. 3). Also in the preferred embodiment, shank 14 is integral with upper housing 34 and housing 12 and shank 14 are made out of aluminum. As will be readily apparent to those skilled in the art, a number of variations can be made to these components. For instance, finder 10 can be manufactured without shank 14 such that the upper housing 34 is configured to be directly received in and engaged by chuck 24 of work tool 28. In addition, housing 12 can be a single piece unit and it and the other components of finder 10 can be made out of a variety of different materials, including various metals, plastics and composites. As explained in more detail below, finder 10 of the present invention utilizes beam of light 18 to provide direct indication of the center 30, edge 32 or other specific spot of workpiece 22, thereby eliminating the requirement to make adjustments and the need to physically contact finder 10 against the workpiece 22.

As stated above, in the preferred embodiment of finder 10 of the present invention housing 12 is a two-piece component comprising upper housing 34 threadably engaged with lower housing 36. Although housing 12 can be a single component or comprise more than two sub-housing components, use of upper 34 and lower 36 housings is preferred for ease of manufacturing and replacement of the batteries, shown as 42 in FIG. 3, as needed by the user. To facilitate the joining of upper 34 and lower 36 housings into housing 12, in the preferred embodiment upper housing 34 has a threaded end 44 configured to be threadably received in the internally threaded open end 46 of lower housing 36 so as to form a chamber 48 defining the aforementioned battery compartment 38 and light compartment 40 for containing the preferred electrical power and light components necessary to operate finder 10 of the present invention. Although chamber 48 can be completely enclosed, for instance if finder 10 is to be used in a wet environment, in the preferred embodiment battery compartment 38 is at least partially open (as best shown in FIGS. 3 and 9) to allow the user to easily provide power for the beam of light 18. Use of threaded ends to join the two housing components upper housing 34 and lower housing 36 provides the user with relatively easy access to replace batteries 42, the preferred source of electrical power for finder 10, as needed. Although the figures and description set forth herein show and describe housing 12 being divided between battery compartment 38 and light compartment 40, those skilled in the art will recognize that the present invention is not so limited. For instance, housing 12 can be divided at a location closer either to first end 16 or second end 20, with both battery compartment 38 and light compartment 40 in same separate housing component of housing 12. As an example, first end 16 can be configured such that a section of housing 12 threadably separates from the shank 14 to allow the user to remove batteries 42 through the open first end 16 of housing 12. In yet another alternative embodiment, likely not preferred, housing 12 can be sealed to permanently enclose batteries 42 into chamber 48 such that finder 10 is disposed once the batteries are fully discharged.

To provide the beam of light 18, finder 10 includes a light unit 50 that is connected to a source of electrical power, which in the preferred embodiment is batteries 42. The preferred light unit 50 is configured to require a relatively small amount of electrical power to operate so as to generate light beam 18. As shown in FIG. 3, one or more batteries 42 of the micro cell type (i.e., 1.5 volt batteries) will generally be sufficient to power light unit 50 and provide a sufficient beam of light 18 for use to find the center 30 or edge 32 of workpiece 22, which will typically only require the beam of light 18 to travel less than twelve inches. Although the use of one or more regular disposable alkaline batteries is preferred, those skilled in the art will recognize that a variety of different types and configurations of batteries 42 will be adaptable for use with finder 10 of the present invention. In an alternative embodiment, batteries 42 can be of the rechargeable type and finder 10 be configured to allow the user to recharge batteries 42. In this embodiment, housing 12 can be sealed to prevent the user from removing batteries 42. In yet another alternative embodiment, finder 10 can comprise suitable wiring or other electrical mechanism to electrically connect light unit 50 with an external source of electrical power, such as a source of AC electricity. In one configuration of this embodiment, the electricity can be delivered through the connection between shank 14 and spindle 26 of work tool 28.

In the preferred embodiment of finder 10, light unit 50 has a source of light 52 that is configured to direct a concentrated, visible beam of light 18 towards and onto workpiece 22, as shown in FIG. 1. The preferred source of light 52 is a laser diode module that can deliver a straight, true beam of light 18, such as those utilized in laser pens, pointers and remotes. The preferred laser diode module 52 is one that includes an integrated optic, laser diode and driver circuit, such as those commercially available from Quartron USA Inc. out of Walnut, Calif. In general, this type of light source is preferred due to the relatively lower power requirements and usage, durability and ability to generate a straight and true beam of light. As set forth below, in the preferred embodiment second end 20 of housing 12 is configured to provide a beam of light 18 that ends up as a very fine dot, shown as 53 on FIG. 1, on workpiece 22 so that precise identification of center 30 or edge 32 of workpiece 22 can be achieved by the user. Although other types of light generating devices, including light bulbs and the like, can be utilized for source of light 52, it is believed that the laser diode module light source is preferred due to the features described above. As is well known, if the lens or other optics are not built-in to or otherwise incorporated with source of light 52, then finder 10 will need to have a focusing lens at or near second end 20 of housing 12. The lens can have a fixed focal length or be an adjustable focus lens.

As best shown in FIG. 3, the laser diode module 52 of finder 10 is positioned in a module chamber 54 in an elongated light tube 56 disposed in light compartment 40 of lower housing 36. In the preferred embodiment, laser diode module 52 is fixedly attached to the interior of module chamber 54 and configured to discharge light through light tube 56 towards second end 20 of housing 12. In the preferred embodiment, light tube 56 is made out of brass or other electrically conductive material so as to complete an electrical circuit, with housing 12, interconnecting batteries 42 and laser diode module 52. To secure light tube 56 in light compartment 40, finder 10 of the present invention includes a light tube sleeve 58 around the first end 60 of light tube 56 that is configured to tightly hold light tube, and therefore laser diode module 52, in place inside light compartment 40 near open end 46 thereof. In the preferred embodiment, light tube sleeve 58 is made out of a non-electrically conductive material, such as plastic, that is suitable for securing light tube 56 in light compartment 40. In one embodiment, the inventor has found that the plastic acetal works well for light tube sleeve 58. With the first end 60 of light tube 56 secured at or near open end 46 of light compartment 40, the second end 62 of light tube 56 is at or near the generally closed end, except as explained below, of light compartment 40 that forms second end 20 of housing 12. As shown in FIG. 3, a spring 64 is attached to laser diode module 52 to bias against batteries 42 so as to maintain laser diode module 52 in electrical contact therewith.

As will be recognized by those skilled in the art, to complete the electrical circuit between batteries 42 and laser diode module 52 without the use of wires, the brass light tube 56 must contact housing 12. One way of achieving the necessary contact is with the use of an adjusting mechanism comprising one or more sets of adjusting members 66, such as screws, disposed in a side aperture 68 on lower housing 36, as best shown in FIG. 3. The adjusting mechanism is configured to align the light from laser diode module 52, or other source of light, with the centerline of spindle 26. In the preferred embodiment of the present invention, the light from laser diode module 52 passes through light discharge aperture 70 in the end face 72 at the second end 20 of housing 12, as best shown in FIG. 5. Whether due to wear on the work tool 28, such as worn quill bearings, or from the user dropping or otherwise hitting finder 10 hard, it is possible for the finder 10 to become unaligned relative to the centerline of spindle 26. In addition, use of finder 10 on different machines may require aligning finder 10 for the new machine. The user can determine that re-alignment is necessary when rotation of chuck 24 with finder 10 therein results in a circle of light instead of fine dot 53 on the target area. In the preferred embodiment, four equally spaced adjusting members 66 are utilized, one each for four side apertures 68 that are equally spaced around the circumference of lower housing 36. In this manner, the user can utilize a north-south, east-west alignment process to obtain the desired fine dot 53 on the target area. For best alignment purposes, the four or preferably at least three such adjusting members 66 are utilized. In a preferred embodiment adjusting members 66 are threadably received by apertures 68 and threaded in and out thereof with an allen wrench, screwdriver or equivalent type of tool to apply more or less force to the second end 62 of light tube 56, in which laser diode module 52 is disposed. In an alternative embodiment, adjusting members 66 comprise an outwardly extending knob or other like device to allow the user to thread adjusting member 66 in and out of side apertures 68 without the use of a tool. In yet another alternative embodiment, adjusting members 66 may be other types of devices than the threaded members which are received in side apertures 68. In any such configuration, the user selectively moves or otherwise operates one or more adjusting members 66 to interact with the light from source of light 52, such as the laser diode module, until the beam of light 18 produces a fine dot 53 on the target area. As stated above, in the preferred embodiment this requires the user to thread adjusting members in and out of their respective side apertures 68.

To accomplish the completed electrical circuit, one or more of adjusting screws 66 need to be made out of material sufficient to electrically interconnect source of light 52, which in the preferred embodiment is in light tube 56, with housing 12. Those skilled in the art will recognize that there are other ways to complete the necessary electrical circuit between laser diode module 52 and batteries 42 than through the use of light tube 56, adjusting screws 66 and housing 12 set forth in the preferred embodiment of the present invention. However, as described above, these components of the electrical circuit provide the alignment function in the finder 10 of the present invention. In addition, as described below, the use of housing 12 as part of the electrical circuit allows finder 10 to be provided with an on/off switch that utilizes the connection or separation of housing 12 from batteries 42 as a mechanism to provide or break the flow of power to source of light 52 to generate the beam of light 18. As explained in more detail below, in the preferred embodiment the electrical circuit between batteries 42 and laser diode module 52 is broken by separating the electrical contact between a portion of housing 12 and batteries 42. When this contact is broken, electricity will not flow to laser diode module 52, thereby preventing the generation of beam of light 18. As will be readily apparent to those skilled in the art, various different configurations can be utilized to separate a portion of housing 12 from batteries 42 so as to break the electrical circuit.

In a preferred embodiment of the present invention, finder 10 includes an on/off switch that is incorporated with battery holder 74, which is rotatably disposed in battery holder compartment 38 of upper housing 34 (as shown in FIGS. 1 through 3 and 7), and configured to selectively connect or interrupt the electrical circuit between housing 12 and batteries 42 so as to selectively provide power to laser diode module 52. In the preferred embodiment, battery holder 74 is a generally cylindrically shaped tubular member made out of a non-conductive material, such as acetal, having a closed first end 76 and an open second end 78. The closed first end 76 has an end piece 80 and open second end 78 is sized and configured to receive and store batteries 42 within battery holder 74. The external diameter of battery holder 74 is sized such that it smoothly rotates within battery compartment 38. In manufacturing, end piece 80 is provided with a generally centrally disposed aperture, not shown, which is sized and configured to receive the stem 82 of an electrically conductive battery button 84 which is placed within battery holder 74 at the first end thereof such that stem 84 extends generally outwardly from end piece 80, as best shown in FIGS. 2 and 13, to contact end wall 86 (best shown in FIG. 10) of battery compartment 38 at the first end 16 of housing 12 to complete the electrical circuit between batteries 42 and laser diode module 52. As shown in FIG. 2, stem 82 of battery button 84 electrically interconnects batteries 42 to end wall 86. To allow the user to selectively allow electricity to flow from batteries 42 to laser diode module 52 to generate beam of light 18, an on/off function is incorporated with battery holder 74. In a preferred embodiment, the on/off function is achieved through the cooperation of an outward extending projecting member 88 on end piece 80 and a recess portion 90 on end wall 86 of battery compartment 38. An on/off indicator mark 92 on the side wall 94 of battery holder 74 is configured to be within cut-out area 96 at first end 16 when finder 10 is in an on condition, meaning beam of light 18 is emanating from second end 20 of housing 12. Side wall 94 also includes one or more ridges 98 to facilitate the user rotating battery holder 74 in battery compartment 38 of upper housing 34. Projecting member 88 and recess portion 90 are positioned such that when on/off indicator mark 92 is within cut-out area 96, projecting member 88 is disposed within recess portion 90, providing contact between stem 82 of battery button 84, completing the electrical circuit and placing finder 10 in an on condition. When the user rotates battery holder 74, by first gently pushing downward on battery holder 74 to move projecting member 88 out of recess portion 90, the action of projecting member 88 against end wall 86 of battery compartment 38 maintains stem 82 in a spaced apart position relative to end wall 86, thereby severing the electrical circuit and placing finder 10 in its off condition. Until battery holder 74 is rotated to place on/off indicator mark 92 in cut-out area 96, projecting member 88 will maintain the spaced apart relation between stem 82 and end wall 86, thereby preventing accidental operation of finder 10 that would prematurely shorten the useful life of batteries 42. If desired, the top of the walls 100 of battery compartment 38 can be tapered to provide comfortable and more smooth operation of battery holder 74 within battery compartment 38.

As set forth above, light from laser diode module or other source of light 52 passes through discharge aperture 70 in end face 72 at the second end 20 of housing 12 to project fine dot 53 onto or alongside workpiece 22. If laser diode module 52 does not include a lens, then the lens will generally be located between laser diode module 52 and discharge aperture 70. To obtain the desired fine beam of light 18 that results in very fine dot 53 on workpiece 22, it is preferred that discharge aperture 70 be very small sized. In a preferred embodiment of the present invention, the inventor has found that a discharge aperture 70 having an opening of approximately 0.0035 inches diameter provides sufficient light to pass to generate the beam of light 18 but still provide very fine dot 53 on workpiece 22. A discharge aperture 70 sized and configured to provide such a fine dot 53 has the advantage to the user of being able to directly and more precisely identify the center 30 or edge 32 of workpiece 22. To help protect discharge aperture 70 from damage by contact against a surface, end face 72 of the preferred embodiment is recessed approximately 0.030 inches relative to the second end 20 of housing 12, as generally shown in FIG. 5.

To be useful for different types of work tools 28, which may have different sized chucks 24, finder 10 of the present invention can be provided with different sizes of shank 14. For instance, finder 10 can be provided with shank 14 having diameters of ¼", ⅜", ½", 6 mm and 10 mm with a length of approximately ⅝" to 1". As previously stated, for some work tools 28 it may be preferred to grasp finder 10 at or near the first end 16 of housing 12, thereby eliminating the need for shank 14 altogether. In other circumstances, it may be preferred to have finder 10 directly incorporated into work tool 28. Typically, however, finder 10 is provided such that it is installed in chuck 24 to align spindle 26 of work tool 28 and then removed to place a mill tool or drill bit in chuck 24 so that mill tool or drill bit is in alignment with the centerline of spindle 26.

In a preferred embodiment, housing 12 is made out of aluminum, light tube 56 and battery button 84 are made out of brass and acetal is utilized for the plastic components. In one embodiment, upper housing 34 is approximately 2.20 inches long, with an approximately 0.25 inch long threaded end 44 and 0.625 inch long battery compartment 38, and lower housing 36 is approximately 1.25 inches long with an approximately 0.0035 inch discharge aperture 70. In use with the preferred embodiment, the user places shank 14 of finder 10 in chuck 24 and engages the chuck mechanism to secure finder 10 to the work tool 28, such as a milling machine. The workpiece 22 is secured to the table (not shown) of work tool 28 50 that workpiece 22 can be selectively moved under finder 10 to find the center 30 or edge 32 thereof. The user turns finder on by pressing his or her thumb against battery holder 74 and applying a slight downward and rotating motion thereto so as to move indicator mark 92 to the cut-out area 96 of housing 12. This causes the projecting member 88 at the second end 78 of battery holder to be inserted into recess portion 90, bringing the stem 82 into contact with end wall 86 of battery compartment, thereby completing the electrical circuit between batteries 42 and housing 12 so as to allow power to flow to the laser diode module 52 and generate the beam of light 18 towards workpiece 22. To check alignment, the user hand rotates spindle 26 to see if the light produces a fine dot 53 or a circular path, in which case alignment is needed. To adjust the alignment, the user provides a mark, such as an "x" at two crossing lines, and operates one or more of adjusting members 66 to move it in or out of its respective side aperture 68 to move laser diode module 52, which in the preferred embodiment is in light tube 56, until the beam of light 18 produces the desired fine dot 53. Once the finder 10 is aligned with the centerline of spindle 26, the user can directly find either or both the center 30 or edge 32 of workpiece 22. To find the center 30 of workpiece 22, the user merely moves workpiece 22 until the beam of light 18 from finder 10 produces the fine dot 53 at the previously marked (i.e., punched) center 30. To find the edge 32 of workpiece 22, workpiece 22 is moved until the beam of light 18 from finder 10 is projecting down the edge 32 of workpiece 22. In either use, finder 10 of the present invention directly finds the center 30 or edge 32 of workpiece 22, thereby eliminating the need to make any calculation adjustments, without having to physically contact workpiece 22, thereby avoiding potential damage to workpiece 22 or the precision tool.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention. One such modification is the use of different materials than those set forth herein. Another modification would be a change in the dimensional characteristics of the various components.

What is claimed is:

1. A center and edge finder utilized in conjunction with a work tool to directly locate a center or an edge of a workpiece with respect to a centerline of said work tool, said center and edge finder comprising:
    a support structure having a first end secured by said work tool and a second end generally disposed in spaced apart relation generally above said workpiece;
    a light source supported by said support structure, said light source configured to emit a beam of light from said support structure towards said workpiece, said beam of light aligned with said centerline of said work tool to project a fine dot on said workpiece, said fine dot in direct alignment with said centerline of said work tool; and
    a source of electrical power electrically connected to said light source,
    whereby said beam of light is directed from said support structure to said center or said edge of said workpiece to align the location of said center or said edge of said workpiece with said centerline of said work tool so that one or more work operations may be performed on said workpiece.

2. The center and edge finder according to claim 1, wherein said support structure is a housing.

3. The center and edge finder according to claim 2, wherein said second end of said housing comprises a discharge aperture and said light source is disposed in said housing, said light source configured to emit said beam of light through said discharge aperture towards said workpiece.

4. The center and edge finder according to claim 3, wherein said discharge aperture is sized and configured to narrow said beam of light so as to define said fine dot.

5. The center and edge finder according to claim 4, wherein said light source is a laser.

6. The center and edge finder according to claim 3, wherein said source of electrical power comprises one or more batteries disposed in said housing.

7. The center and edge finder according to claim 6, wherein said one or more batteries are removably disposed in said housing.

8. The center and edge finder according to claim 6, wherein said one or more batteries are electrically connected to said housing and said light source is electrically connected to said housing so as to complete an electrical circuit between said one or more batteries to said light source.

9. The center and edge finder according to claim 8, wherein said electrical circuit is selectively broken by electrical separation of said housing from said one or more batteries.

10. The center and edge finder according to claim 9, wherein said one or more batteries are disposed in a battery holder, said battery holder configured to selectively allow electrical connection between said one or more batteries and said housing.

11. The center and edge finder according to claim 6, wherein said housing comprises two or more housing components, said two or more housing components interconnected to provide a chamber therein, said light source and said one or more batteries disposed in said chamber.

12. The center and edge finder according to claim 11, wherein said chamber comprises a battery compartment generally at said first end of said housing and a light compartment at said second end of said housing, said one or more batteries disposed in said battery compartment and said light source disposed in said light compartment.

13. The center and edge finder according to claim 11, wherein said one or more batteries are removable from said chamber by separation of at least two of said two or more housing components.

14. The center and edge finder according to claim 11, wherein said light source is a laser.

15. The center and edge finder according to claim 1, wherein said support structure has one or more adjusting members, said one or more adjusting members configured to facilitate alignment of said beam of light with said centerline of said work tool.

16. The center and edge finder according to claim 15, wherein each of said one or more adjusting members are threadably received in an aperture on said support structure and configured to interact with said source of light to align said beam of light with said centerline of said work tool.

17. The center and edge finder according to claim 1, wherein said work tool comprises a rotating spindle having a chuck, said centerline of said work tool corresponding to the axis of said spindle, said support structure secured by said chuck.

18. The center and edge finder according to claim 17, wherein said first end of said support structure comprises a shank configured to be secured in said chuck.

19. A center and edge finder utilized in conjunction with a work tool to directly locate a center or an edge of a workpiece with respect to a centerline of said work tool, said center and edge finder comprising:
 a housing having a first end adapted to be secured by said work tool and a second end with a discharge aperture, said housing secured by said work tool so said discharge aperture is directed generally towards said workpiece;
 a light source in said housing, said light source configured to emit a beam of light through said discharge aperture towards said workpiece to project a fine dot on said workpiece, said fine dot in direct alignment with said centerline of said work tool;
 one or more batteries disposed in said housing, said one or more batteries electrically connected to said light source; and
 a switch electrically interconnecting said light source and said one or more batteries, said switch configured to selectively electrically connect said one or more batteries to said light source,
 whereby said beam of light is directed from said housing through said discharge aperture to said center or said edge of said workpiece to align the location of said center or said edge of said workpiece with said centerline of said work tool so that one or more work operations may be performed on said workpiece.

20. The center and edge finder according to claim 19, wherein said light source is a laser.

21. The center and edge finder according to claim 20, wherein said discharge aperture is sized and configured to narrow said beam of light from said laser so as to define said fine dot on said workpiece.

22. The center and edge finder according to claim 19, wherein said one or more batteries and said light source are electrically connected to said housing so as to complete an electrical circuit between said one or more batteries to said light source, said switch configured to electrically separate said housing from said one or more batteries so as to break said electrical circuit.

23. The center and edge finder according to claim 22, wherein said switch comprises a battery holder configured to selectively electrically separate said one or more batteries from said housing.

24. The center and edge finder according to claim 19, wherein said housing comprises two or more housing components, said two or more housing components interconnected to provide a chamber therein, said light source and said one or more batteries disposed in said chamber.

25. The center and edge finder according to claim 24, wherein said chamber comprises a battery compartment generally at said first end of said housing and a light compartment at said second end of said housing, said one or more batteries removably disposed in said battery compartment and said light source disposed in said light compartment.

26. The center and edge finder according to claim 19, wherein said housing has one or more adjusting members, each of said one or more adjusting members configured to facilitate alignment of said beam of light with said centerline of said work tool.

27. The center and edge finder according to claim 26, wherein each of said one or more adjusting members are threadably received in an aperture in said housing and configured to interact with said source of light to align said beam of light with said centerline of said work tool.

28. The center and edge finder according to claim 19, wherein said work tool comprises a rotating spindle having a chuck and said first end of said housing has a shank, said centerline of said work tool corresponding to the axis of said spindle, said shank secured in said chuck.

29. A center and edge finder utilized in conjunction with a work tool having a rotating spindle and a chuck to directly locate a center or an edge of a workpiece with respect to a centerline of said spindle, said center and edge finder comprising:
  a housing having a first end and a second end, said first end having a shank adapted to be received by said chuck, said second end having a discharge aperture, said housing secured by said chuck so said discharge aperture is directed generally towards said workpiece;
  a light source in said housing, said light source configured to emit a beam of light through said discharge aperture towards said workpiece to project a fine dot on said workpiece, said fine dot in direct alignment with said centerline of said work tool;
  one or more batteries disposed in said housing, said one or more batteries electrically connected to said light source;
  a switch electrically interconnecting said light source and said one or more batteries, said switch configured to selectively electrically connect said one or more batteries to said light source, and
  one or more adjusting members, each of said one or more adjusting members configured to align said beam of light with said centerline of said spindle;
  whereby said beam of light is directed from said housing through said discharge aperture to said center or said edge of said workpiece to align the location of said center or said edge of said workpiece with said centerline of said spindle so that one or more work operations may be performed on said workpiece.

30. The center and edge finder according to claim 29, wherein said light source is a laser.

31. The center and edge finder according to claim 30, wherein said discharge aperture is sized and configured to narrow said beam of light from said laser so as to define said fine dot on said workpiece.

32. The center and edge finder according to claim 29, wherein said switch comprises a battery holder configured to selectively electrically separate said one or more batteries from said housing.

33. The center and edge finder according to claim 29, wherein said housing comprises two or more housing components, said two or more housing components interconnected to provide a chamber therein, said light source and said one or more batteries disposed in said chamber.

34. The center and edge finder according to claim 33, wherein said chamber comprises a battery compartment generally at said first end of said housing and a light compartment at said second end of said housing, said one or more batteries removably disposed in said battery compartment and said light source disposed in said light compartment.

35. The center and edge finder according to claim 34, wherein said light source is a laser.

36. The center and edge finder according to claim 29, wherein each of said one or more adjusting members are threadably received in an aperture in said housing and configured to interact with said source of light to align said beam of light with said centerline of said spindle.

* * * * *